June 28, 1966  L. F. KAMISH  3,258,266
APPARATUS AND METHOD OF MEASURING JUMP AND HEIGHT
Filed March 4, 1964
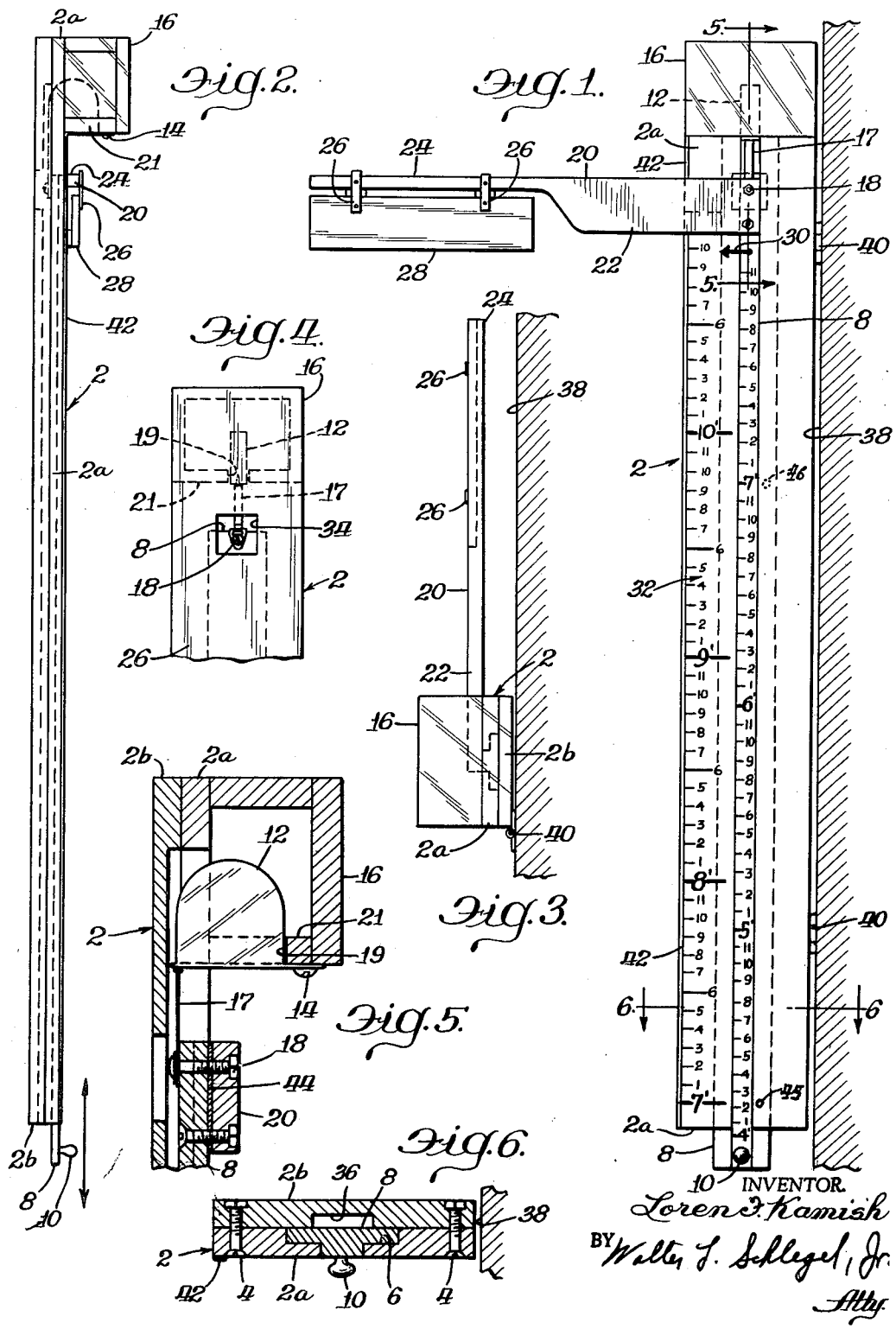
INVENTOR.
Loren F. Kamish
BY Walter J. Schlegel, Jr.
Atty.

United States Patent Office 3,258,266
Patented June 28, 1966

3,258,266
APPARATUS AND METHOD OF MEASURING
JUMP AND HEIGHT
Loren Frank Kamish, Floodwood, Minn.
Filed Mar. 4, 1964, Ser. No. 349,269
4 Claims. (Cl. 273—1.5)

This invention relates to jump measuring devices and more particularly to a device for measuring the ability of an athlete to jump vertically from a standing position.

It is known that this ability can be improved by practice and that by periodically measuring and recording an individual's ability, he can be stimulated to practice and and improve this ability.

A more specific object of the invention is to move the device to an inoperative position against a supporting wall and to move the device to an operative condition substantially perpendicular to said wall so that the individual being tested will not be injured by accidentally brushing the wall during jumping.

Another object of the invention is to quickly adjust the device by positioning a tapping board at various heights which can be quickly and accurately measured.

A further object of the invention is to prevent damage to the device by flexibly attaching the tapping board to its supporting member so that impacts against the tapping board by the fingers of the jumping athlete cannot damage the mounting and adjusting parts of the device.

Yet another object of the invention is to fix the tapping board to a vertical ruler for vertical movement therewith and to mount a pointer on the ruler for indexing with indicia of a ruler on a part of the device which does not move vertically during normal use thereof, whereby when the pointer is indexed with an appropriate indicia of the latter ruler, the first-mentioned ruler constitutes a downward extension thereof for measuring the height of an athlete.

The foregoing and other objects and advantages of the invention will become apparent from a consideration of the following specification and the accompanying drawings, wherein:

FIGURE 1 is a front elevational view of the device in operative position perpendicular to its supporting wall;

FIGURE 2 is a side elevational view taken from the left of FIGURE 1;

FIGURE 3 is a to plan view showing the device in inoperative position pivoted from that of FIGURE 1 to a position parallel to the device's supporting wall;

FIGURE 4 is a fragmentary rear elevational view;

FIGURE 5 is a sectional view on line 5—5 of FIGURE 1; and

FIGURE 6 is a sectional view on line 6—6 of FIGURE 1.

Describing the invention in detail, the novel measuring device comprises a flat body or support 2 formed by a pair of flat boards or slabs 2a and 2b interconnected by bolt and nut assemblies 4 and defining a T-shaped groove 6 within which a slideable T-shaped ruler member 8 is slideably mounted for vertical manual adjustment as by a knob 10.

The ruler member 8 is held in any adjusted position by conventional spring sash balance 12 attached by a screw 14 (FIG. 5) to the underside of a hollow head 16 which houses the spring balance 12 and is attached to the body 2 in any convenient manner, as by screws or adhesive (not shown).

As best seen in FIGURES 4 and 5, the balance 12 is snugly received within a slot 19 in a bottom wall 21 of the head, the fit in said slot affording lateral stability for the balance 12 so that a single screw 14 is adequate to anchor the balance 12 to the head 16.

The spring balance 12 is not shown in detail because the internal construction thereof is not per se part of the present invention, although the arrangement of said balance 12 in the combination is part of the present invention. A typical balance which could be used for this purpose is disclosed in U.S. Letters Patent 2,534,968, issued December 19, 1950, to Glenn B. Haas.

The spring balance comprises a tape 17 which is attached by a bolt and nut assembly 18 to the upper end of the ruler member 8 to which is connected a member in the form of an arm 20 having a relatively wide segment 22 (FIG. 1) attached as by said bolt and nut assembly 18 to the ruler member 8. The arm 20 also comprises a relatively narrow member 24 flexibly connected as by leather straps 26 to a tapping board 28, the lower edge of which is aligned horizontally with a pointer 30 (FIG. 1) mounted on the ruler member 8 for vertical movement therewith.

The pointer 30 is adapted to register with height indicia illustrated as foot and inch markings of a vertical ruler 32 (FIG. 1) formed on the outer face of the board 2a, so that the pointer 30 indicates the distance between the floor (not shown) and the lower edge of the tapping board 28.

The board 2b preferably has an access hole 34 for convenient attachment of the spring balance tape 17 to the back side of ruler member 8 by means of the bolt and nut assembly 18, and the inner surface of the board 2b may have a vertical groove 36 to afford clearance for the tape 17 as the pointer 30 and ruler 8 are pulled downwardly from the position shown in the drawings. The groove 36 would, of course, be unnecessary if the tape 17 were attached to the top of the ruler 8.

FIGURE 3 shows the novel device in inoperative condition with the body 2 and arm 20 parallel to a wall 38 to which the body is attached by hinges 40.

When it is desired to use the novel device, the body 2 and arm 20 are pivoted on the hinges 40 to a position shown in FIGURE 1 whereat the body 2 and arm 20 are substantially perpendicular to the wall 38.

The pointer 30 is then adjusted to indicate the vertical reach of the individual being tested. Vertical reach is the distance between the floor (not shown) and the tips of the fingers of one hand held in its uppermost position while the individual is standing. After the vertical reach has been noted, the pointer 30 is moved upwardly in increments to measure the highest position of the tapping board 28 at which the tested individual can tap it with the fingers of that hand by jumping from a standing position beneath the tapping board.

By deducting the first measurement (i.e. vertical reach) from the second measurement, the individual's standing vertical jump is indicated. In other words, if the vertical reach is seven feet and the highest position at which the individual can tap the board 28 by jumping is nine feet, the individual's standing vertical jump is measured at two feet. This vertical jump is a very important ability in a game such as basketball and can be improved by practice and exercise. Thus by periodically measuring and recording an individual's standing vertical jump, his desire to improve that ability can be stimulated.

If the device is used to measure an individual's height, the pointer 30 is registered with the eight foot indicia on the ruler 32, whereupon ruler 8 can be used to measure the height of individuals from 4 to 8 feet, and the ruler 32 can be used to measure the height of individuals taller than 8 feet. In other words, when pointer 30 is registered with the eight foot indicia on the ruler 32, the ruler 8 becomes an accurate downward extension thereof.

It may be noted that a wear strip 42 of felt or plastic or other suitable material is preferably attached to the front face of the board 2a at its lateral edge immediately adjoining the ruler 32 which is inscribed or otherwise fixed on the board 2a. Also, a spacer 44 (FIG. 5) is preferably interposed between the ruler 8 and the arm portion 22 which is attached thereto, said spacer 44 holding the arm 20 out of contact with the board 2a as long as the ruler 8 has a snug fit within the slot 6 of the body 2.

If desired, the ruler 8 may be releasably interlocked as a downward extension of ruler 32, as for example by a pin (not shown) removably inserted into complementary holes 45 and 46 (FIG. 1) of the board 2a and the ruler 8, respectively.

What is claimed is:

1. In a device of the class described, a flat body, hinge means thereon hinged to a wall for pivotal movement of the body to an inoperative position parallel with the wall and to an operative position substantially perpendicular thereto, a vertical ruler, means mounting said vertical ruler on said body for vertical movement relative thereto and for substantial extension below said body, a spring balance attached to said body outwardly of said hinge means and having a tape connected to the ruler for holding it in any vertically adjusted position, an arm attached to said ruler and extending therefrom in a plane substantially parallel to the plane of said body, a tapping board flexibly attached to the underside of said arm, another ruler fixed on said body and having indicia indicating their distance above a floor beneath the device, a pointer fixed to the top of said first-mentioned ruler and registerable with indicia of the second-mentioned ruler, said pointer being horizontally aligned with the lower edge of said tapping board, the indicia of the first-mentioned ruler which is indexed with said pointer being of a value at least as great as the indicia of lowest value on the second-mentioned ruler, indicia of the same value on respective rulers being indexed at times so that the first-mentioned ruler is a downward extension of the second-mentioned ruler and can be used for measuring height.

2. A jump measuring device comprising a support having a ruler fixed thereon with indicia indicating the distance from a floor beneath the device and spaced therefrom, a member mounted on said support for vertical adjustment relative thereto, a tapping board flexibly connected to said member and disposed therebeneath, a second ruler fixed to and depending from said member and spaced from said tapping board, a pointer fixed to said second ruler and indexed with an indicia thereof which is as high in value as the lowest indicia of said first-mentioned ruler, said pointer being aligned with the lower edge of the tapping board and being indexible with selected indicia of the first-mentioned ruler to measure standing vertical jump of a tested individual, and said second-mentioned ruler being a downward extension of the first-mentioned ruler to measure height of an individual when said pointer is indexed with indicia of the first-mentioned ruler which is identical in value to the first-mentioned value.

3. A device according to claim 2, wherein means are provided for releasably and positively interlocking the pointer in indexed position with respect to the last-mentioned indicia.

4. A method of measuring vertical jump of an individual comprising the steps of suspending a tapping board at the maximum height above a floor at which the individual can touch the tapping board while standing at a point on said floor beneath the tapping board and while raising the fingertips of one hand to their highest possible position at which they barely touch the lower edge of the tapping board, and then incrementally raising said tapping board until it is suspended at the highest position thereof at which said individual can touch the tapping board with said fingertips by jumping from said point.

References Cited by the Examiner

UNITED STATES PATENTS

| 1,860,184 | 5/1932 | Jacobs | 33—169 |
| 1,985,527 | 12/1934 | Taylor | 33—169 |
| 2,324,334 | 7/1943 | Sutton | 33—169 |
| 2,469,145 | 5/1949 | Baliff | 33—169 |

FOREIGN PATENTS 290,929  12/1931  Italy.

OTHER REFERENCES

Mankonen: "The Neg'ator in Instrumentation," I.S.A. Journal, September 1952, pp. 115–119.

RICHARD C. PINKHAM, *Primary Examiner.*

ISAAC LISANN, *Examiner.*

FRANK H. THOMSON, ARNOLD W. KRAMER,
*Assistant Examiners.*